(12) United States Patent
Hwang et al.

(10) Patent No.: US 7,875,383 B2
(45) Date of Patent: Jan. 25, 2011

(54) POUCH TYPE SECONDARY BATTERY

(75) Inventors: In-Won Hwang, Cheonan-si (KR);
Hyung-Bok Lee, Seoul (KR);
Joong-Hun Kim, Cheonan-si (KR);
Jae-Hoon Choi, Cheonan-si (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 10/936,668

(22) Filed: Sep. 9, 2004

(65) Prior Publication Data
US 2005/0084749 A1 Apr. 21, 2005

(30) Foreign Application Priority Data
Oct. 16, 2003 (KR) .................. 10-2003-0072155

(51) Int. Cl.
*H01M 6/12* (2006.01)
(52) U.S. Cl. ...................... 429/162; 429/163
(58) Field of Classification Search .................. 428/162
See application file for complete search history.

(56) References Cited

U.S. PATENT DOCUMENTS

| | | | | |
|---|---|---|---|---|
| 6,319,630 B1 * | 11/2001 | Hasegawa et al. | ........... | 429/162 |
| 6,368,744 B1 * | 4/2002 | Hatazawa et al. | ........... | 429/163 |
| 6,653,018 B2 * | 11/2003 | Takahashi et al. | ........... | 429/185 |
| 2003/0017388 A1 | 1/2003 | Furusaki | | |
| 2004/0038122 A1 * | 2/2004 | Hisamitsu et al. | ........... | 429/120 |

FOREIGN PATENT DOCUMENTS

EP      1 035 597 A1    9/2000
EP      1035597         9/2000

(Continued)

OTHER PUBLICATIONS

Korean Office Action issued Jun. 30, 2005 in corresponding Korean Application No. 10-2003-0072155 and English Translation.

(Continued)

*Primary Examiner*—Patrick Ryan
*Assistant Examiner*—Cynthia Lee
(74) *Attorney, Agent, or Firm*—Knobbe Martens Olson & Bear LLP

(57) ABSTRACT

A pouch type secondary battery which can prevent a cut portion from electrically contacting a protective circuit module, thereby preventing an electrical short circuit and acceleration of corrosion of a core material and enhancing safety includes an electrode assembly having a first electrode plate, a second electrode plate, and a separator; a pouch case made of a flexible material, and having a container, insulated at least on its inner surface and accommodating the electrode assembly, and sealing portions along an edge of the container, the sealing portions including a first sealing portion through which electrode taps of the electrode assembly extend from the pouch case, and a second sealing portion and a third sealing portion respectively positioned at opposite sides of the first sealing portion, the second an third sealing portions being folded at least one time; a protective circuit module connected to the electrode taps and mounted on an outer surface of the first sealing portion; and a short circuit protector formed in at least one among the first through third sealing portions to prevent an electrical short circuit between each sealing portion and the protective circuit module.

9 Claims, 22 Drawing Sheets

FOREIGN PATENT DOCUMENTS

| | | |
|---|---|---|
| JP | 2000-195474 | 7/2000 |
| JP | 2000-268807 | 9/2000 |
| JP | 2001-118547 | 4/2001 |
| JP | 2001-126686 | 5/2001 |
| JP | 2001-250515 | 9/2001 |
| JP | 2001-250586 | 9/2001 |
| JP | 2001-325925 | 11/2001 |
| JP | 2001-325943 | 11/2001 |
| JP | 2001-357824 | 12/2001 |
| JP | 2001-357825 | 12/2001 |
| JP | 2002-56835 | 2/2002 |
| JP | 2002-141030 | 5/2002 |
| JP | 2002-289154 | 10/2002 |

OTHER PUBLICATIONS

Search Report issued in European Patent Application No. 04256259.5 on Aug. 14, 2006.

Office Action issued on Jan. 4, 2008 by the Chinese Patent Office for Chinese Patent Application No. 200410088046.

Office Action issued on Feb. 26, 2008 by the Japanese Patent Office for Japanese Patent Application No. 2004-154384.

* cited by examiner

POUCH TYPE SECONDARY BATTERY

CROSS-REFERENCE TO RELATED APPLICATIONS

This application claims the benefit of Korean Patent Application No. 2003-72155, filed on Oct. 16, 2003, in the Korean Intellectual Property Office, the disclosure of which is incorporated herein by reference.

BACKGROUND OF THE INVENTION

1. Field of the Invention

The present invention relates to a secondary battery, and more particularly, to a pouch type secondary battery having a pouch case with an improved structure.

2. Description of the Related Art

Secondary batteries are rechargeable. They can be made small and have a large capacity. Representative secondary batteries are nickel-metal hydride (Ni-MH) batteries and lithium (Li) secondary batteries.

According to the type of a case accommodating an electrode assembly, secondary batteries can be divided into cylindrical batteries using a cylindrical aluminum can, prismatic batteries using a prismatic aluminum can, and pouch type batteries using a thin pouch case.

Pouch type secondary batteries are manufactured by housing an electrode assembly generating a predetermined current and liquid electrolyte into a pouch case made of a flexible material in a bag shape and hermetically sealing the pouch case. Such a pouch type secondary battery is light and flexible to facilitate the design of a packaging structure. Accordingly, the pouch type secondary batteries are widely used for portable telephones and video cameras. FIG. 1 illustrates a pouch type secondary battery to which a protective circuit module is coupled. First and second electrode tabs 2a and 2b extend from and are folded on a sealing portion 3a at an end of a pouch case 1 having a bag shape. A protective circuit board 4 is coupled to the first and second electrode tabs 2a and 2b. Sealing portions 3b are folded one or two times and respectively closely stuck to opposite sides of the pouch case 1.

However, since a corner 3c of the sealing portions 3a and 3b protrudes outward, the corner 3c may interfere with an external pack used for packaging. In particular, since such an external pack tends to curve, the corner 3c may be crushed by the curved external pack.

The pouch case 1 is usually made of a metal foil such as an aluminum foil, a surface of which underwent an insulation process. In other words, modified polypropylene, i.e., a polymer resin, for example, cast polypropylene (CPP), is deposited on the aluminum foil, thereby forming a thermal adhesive layer, and a resin material such as nylon or polyethylene terephtalate (PET), is formed at the outer side of the aluminum foil. However, as shown in FIG. 1, cutting is performed at a portion of the pouch case 1 where the electrode tabs 2a and 2b are exposed outside. Accordingly, a material of the pouch case 1, and particularly, a core material, i.e., the aluminum foil, may be exposed outside of the cut portion of the pouch case 1.

In particular, the corner 3c may contact a circuit pattern (not shown) of the protective circuit board 4 or electronic parts (not shown) mounted on the protective circuit board 4. This contact may cause an electric short circuit of a module of the protective circuit board 4 and also accelerate the corrosion of the corner 3c.

These problems occur more frequently when the corner 3c is crushed by an external pack. In other words, a cut end of the crushed corner 3c is more likely to contact the circuit pattern of the protective circuit board 4 or the electronic parts.

Japanese Patent Publication No. 2000-268807 discloses a secondary battery having a structure in which two corners at opposite ends of a sealing portion from which electrode tabs extend are cut away. This secondary battery includes cut portions C at the opposite corners of a sealing portion 3a from which electrode tabs 2a and 2b extend, as shown in FIGS. 2B and 2C. Sealing portions 3b at the opposite sides of the secondary battery are folded two times along the folding lines L1 and L2 to increase a size K of a space for accommodating a protective circuit board 4, as shown in FIGS. 2A and 2D. In such a secondary battery, the cut ends of the cut portions C are disposed at the sides of the protective circuit board 4. As a result, the cut ends contact the protective circuit board 4 and thus may electrically short circuit a protective circuit module of the protective circuit board 4. In other words, this second battery cannot overcome the problems described above with reference to FIG. 1.

SUMMARY OF THE INVENTION

The present invention provides a pouch type secondary battery which prevents a cut portion from electrically contacting a protective circuit module, thereby preventing an electrical short circuit and corrosion acceleration of a core material of the battery.

The present invention also provides a pouch type secondary battery having enhanced safety.

According to an aspect of the present invention, there is provided a pouch type secondary battery including an electrode assembly which comprises a first electrode plate, a second electrode plate, and a separator; a pouch case which is made of a flexible material, the pouch case comprising a container, which is insulated at least on its inner surface and accommodating the electrode assembly, and sealing portions along an edge of the container, the sealing portions comprising a first sealing portion through which electrode tabs of the electrode assembly extend from the pouch case, and a second sealing portion and a third sealing portion which are respectively positioned at opposite sides of the first sealing portion, the second an third sealing portions being folded at least one time; a protective circuit module which is connected to the electrode tabs and mounted on an outer surface of the first sealing portion; and a short circuit protector which is formed in at least one among the first through third sealing portions to prevent an electrical short circuit between each sealing portion and the protective circuit module.

According to an aspect of the present invention, the second and third sealing portions may be respectively folded toward opposite sides of the pouch case, and the short circuit protector may comprise cut portions formed by cutting a corner between the first sealing portion and the second sealing portion and a corner between the first sealing portion and the third sealing portion so that an electrical contact between the corners among the first through third sealing portions and the protective circuit module can be prevented.

According to an aspect of the present invention, at least one of the cut portions may be formed to be slanted.

According to an aspect of the present invention, at least one of the cut portions may be cut along a curve. The curve may be a single circular arc or may comprise at least two circular arc having different radii.

According to an aspect of the present invention, an end of each cut portion may be positioned in at least the first sealing portion.

According to an aspect of the present invention, an end of a cut portion may be positioned on a border line between the first and second sealing portions, and an end of another cut portion may be positioned on a border line between the first and third sealing portions.

Alternatively, an end of a cut portion may be positioned at a point nearest to the first sealing portion on a folding line along which the second sealing portion is folded, and an end of another cut portion may be positioned at a point nearest to the first sealing portion on a folding line along which the third sealing portion is folded.

According to an aspect of the present invention, an end of a cut portion may be positioned in the second sealing portion, and an end of another cut portion may be positioned in the third sealing portion.

According to an aspect of the present invention, an end of each cut portion may be positioned to correspond to the container of the pouch case.

According to an aspect of the present invention, a minimum distance between each cut portion and the container may be set such that the cut portion breaks when an internal pressure of the container exceeds a predetermined limit. The minimum distance between each cut portion and the container may be set such that the cut portion breaks when an internal pressure of the container is 2 through 20 and preferably 4 through 8 atmospheres.

According to an aspect of the present invention, the second and third sealing portions may be respectively folded toward opposite sides of the pouch case, and the short circuit protector may comprise folded portions which are formed by folding corners of the respective second and third sealing portions, near the protective circuit module, outward from the container.

According to an aspect of the present invention, at least one of the folded portions may be formed to be slanted.

According to an aspect of the present invention, the pouch type secondary battery may further comprise auxiliary cut portions at corners of the respective second and third sealing portions at a side opposite to the first sealing portion.

According to an aspect of the present invention, the pouch case may be packaged into an external pack, and the auxiliary cut portions may have a shape corresponding to an inner shape of the external pack.

According to an aspect of the present invention, the second and third sealing portions may be folded toward an outer surface of the pouch case to be opposite the protective circuit module, and the short circuit protector may comprise folded portions of the respective second and third sealing portions.

According to an aspect of the present invention, folding lines along which the respective second and third sealing portions are folded may be respectively parallel with opposite sides of the pouch case.

According to an aspect of the present invention, each of the second and third sealing portions may be folded one time.

According to an aspect of the present invention, the pouch case may be packaged into an external pack with an adhesive member interposed between the external pack and at least the outer surface of the pouch case, and the adhesive member may be partially positioned between the folded portions of the respective second and third sealing portions.

According to an aspect of the present invention, the short circuit protector may comprise at least one insulating tape interposed between upper and lower parts of the first sealing portion.

According to an aspect of the present invention, the insulating tape may extend from the first sealing portion to the second and third sealing portions.

According to an aspect of the present invention, the insulating tape may be exposed outside a corner where the first sealing portion overlaps each of the second and third sealing portions.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and/or advantages of the invention will become apparent and more readily appreciated from the following description of the embodiments, taken in conjunction with the accompanying drawings of which.

DETAILED DESCRIPTION OF THE EMBODIMENTS

Figure 1:
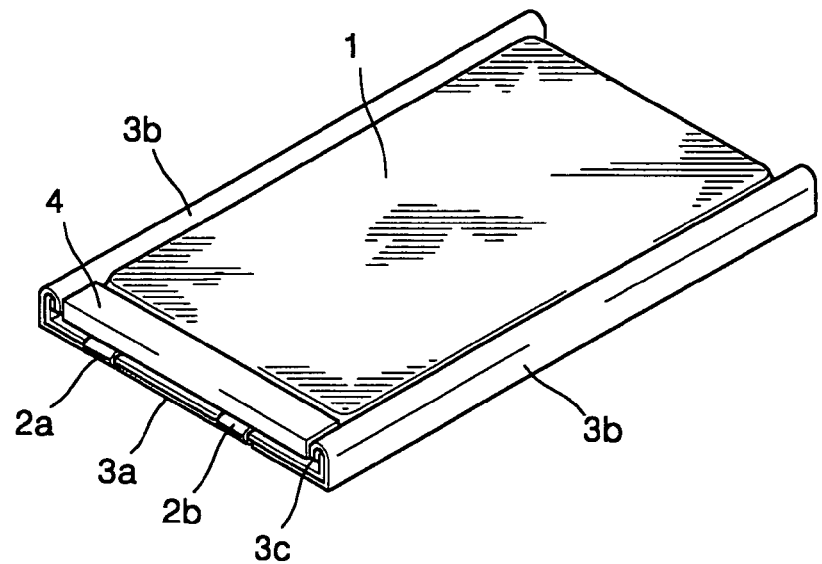
FIG. 1 is a perspective view of a conventional pouch type secondary battery coupled with a protective circuit module.
Figure 2A:
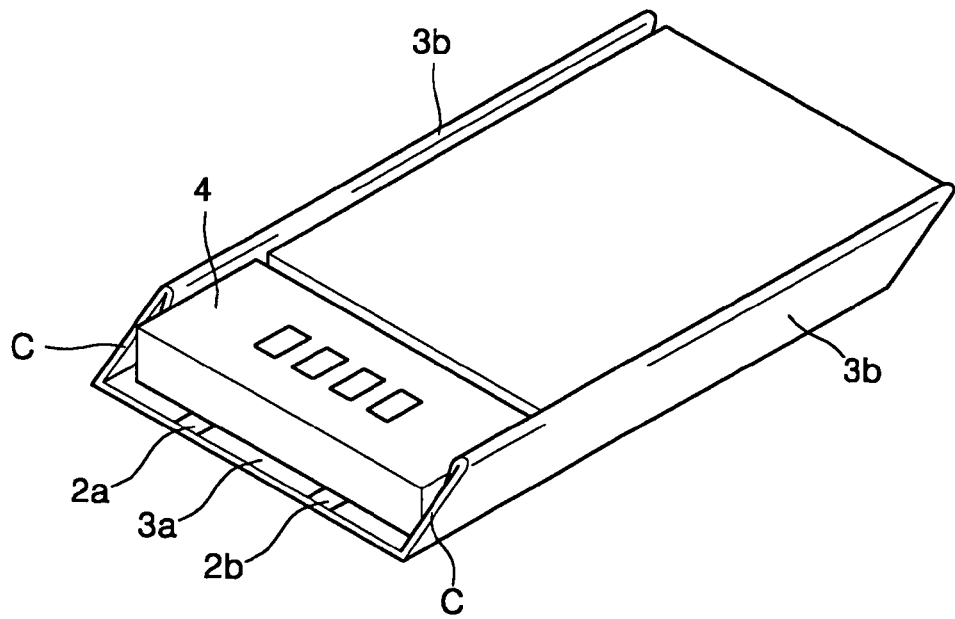
FIGS. 2A through 2D are diagrams illustrating another conventional pouch type secondary battery.
Figure 2B:
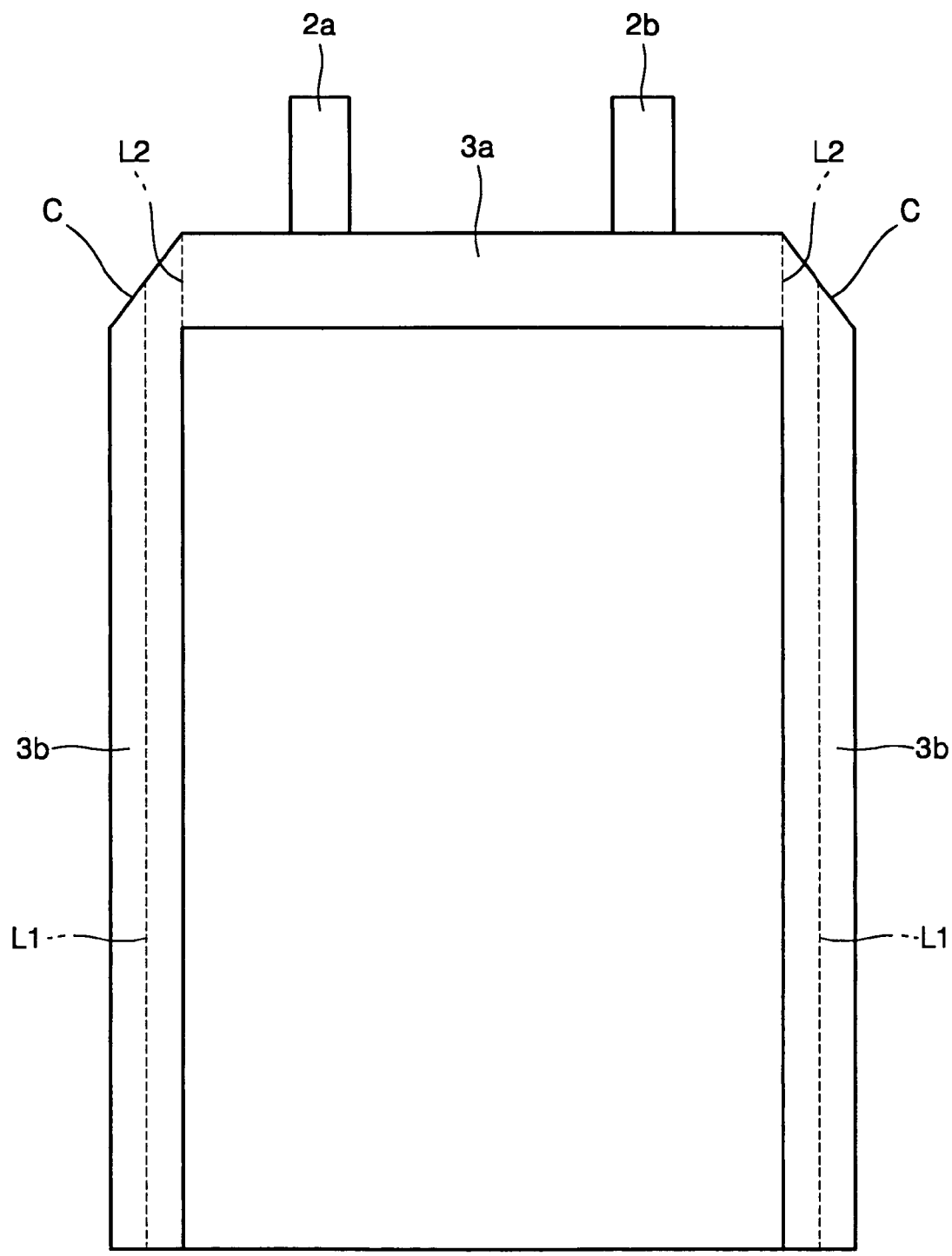
Figure 2C:
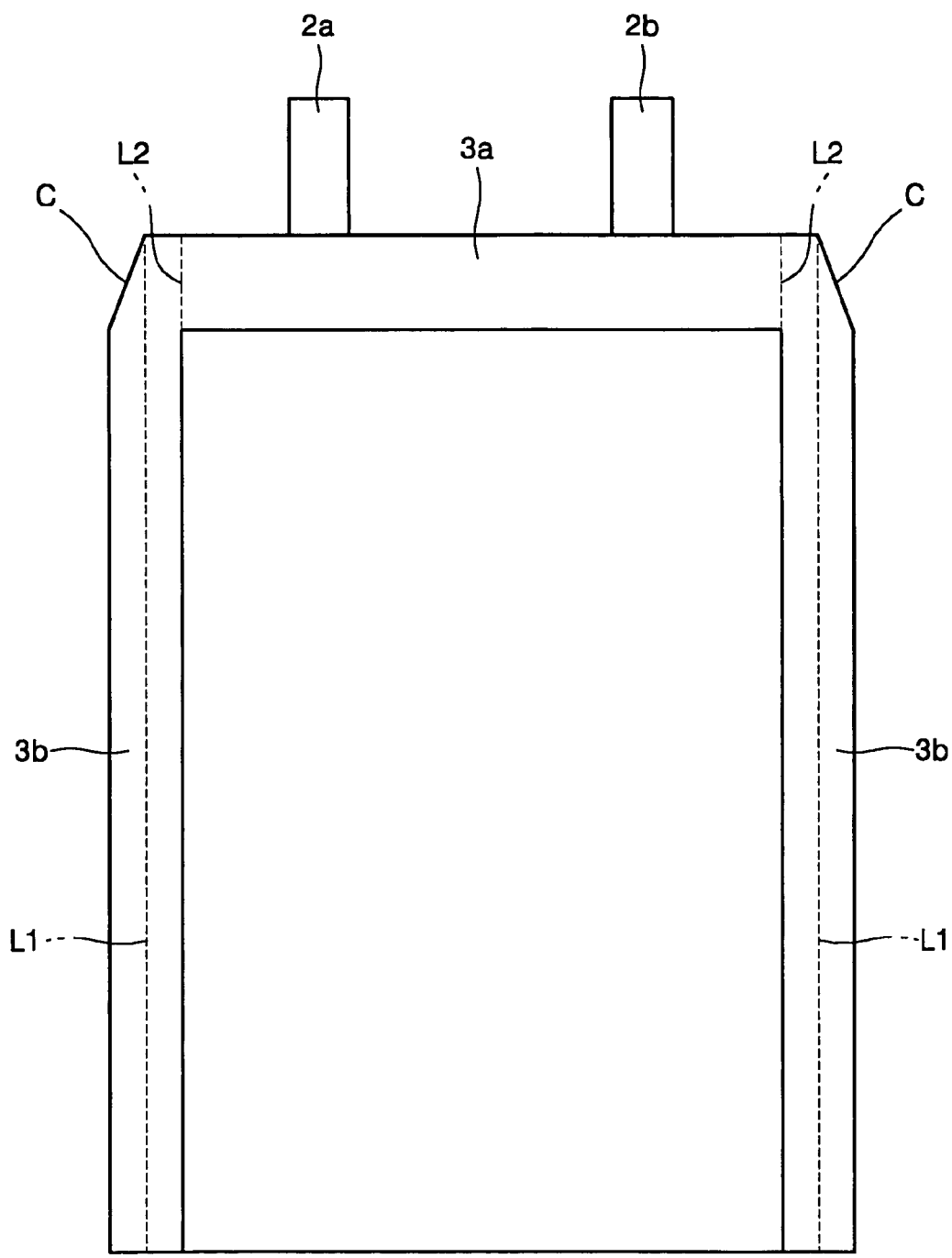
Figure 2D:
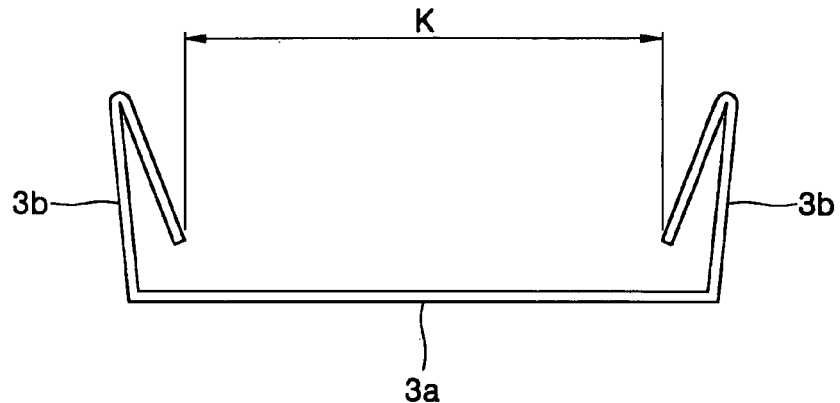

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
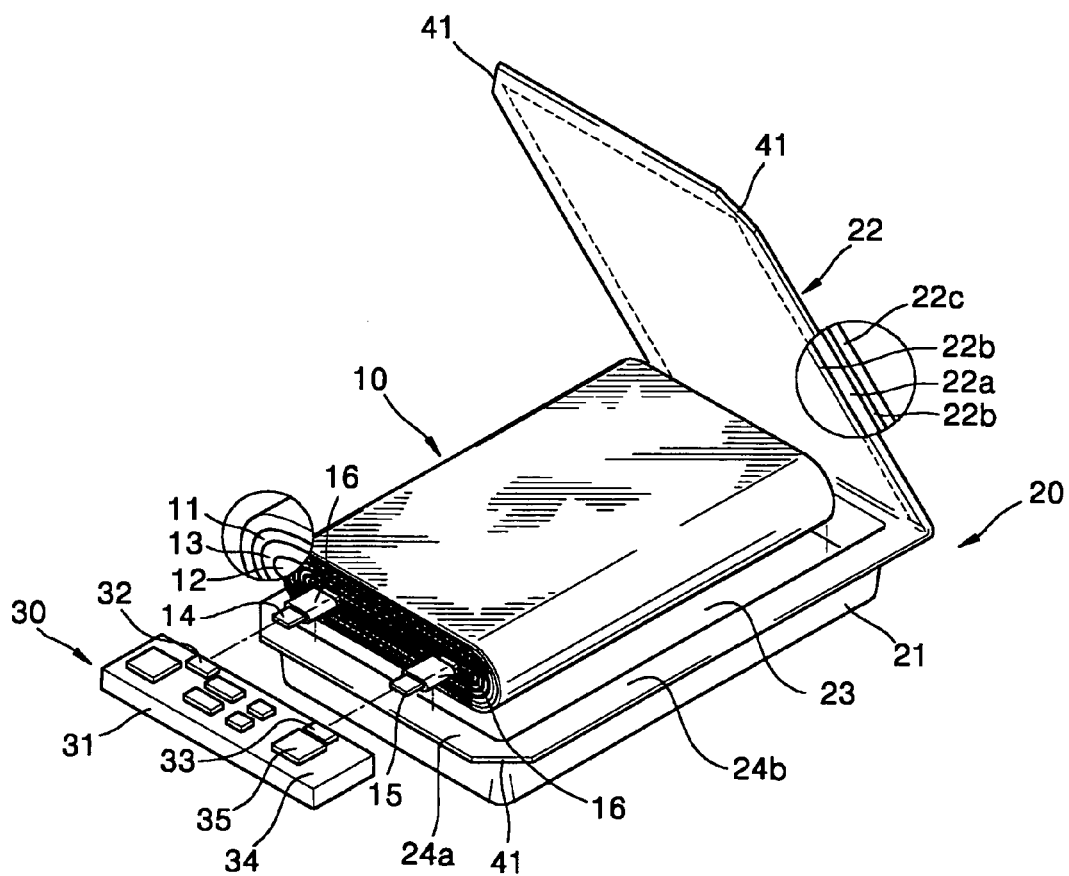
FIG. 3 is an exploded perspective view of a pouch type secondary battery according to an embodiment of the present invention.
Figure 4:
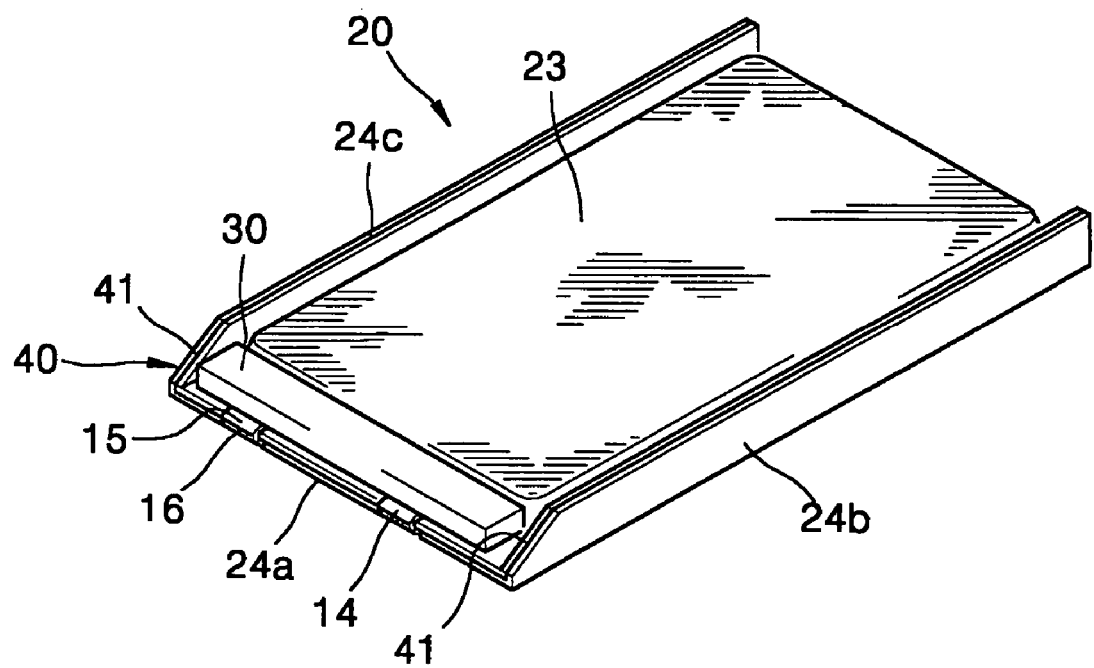
FIG. 4 is a perspective view of the pouch type secondary battery shown in FIG. 3.
Figure 5:
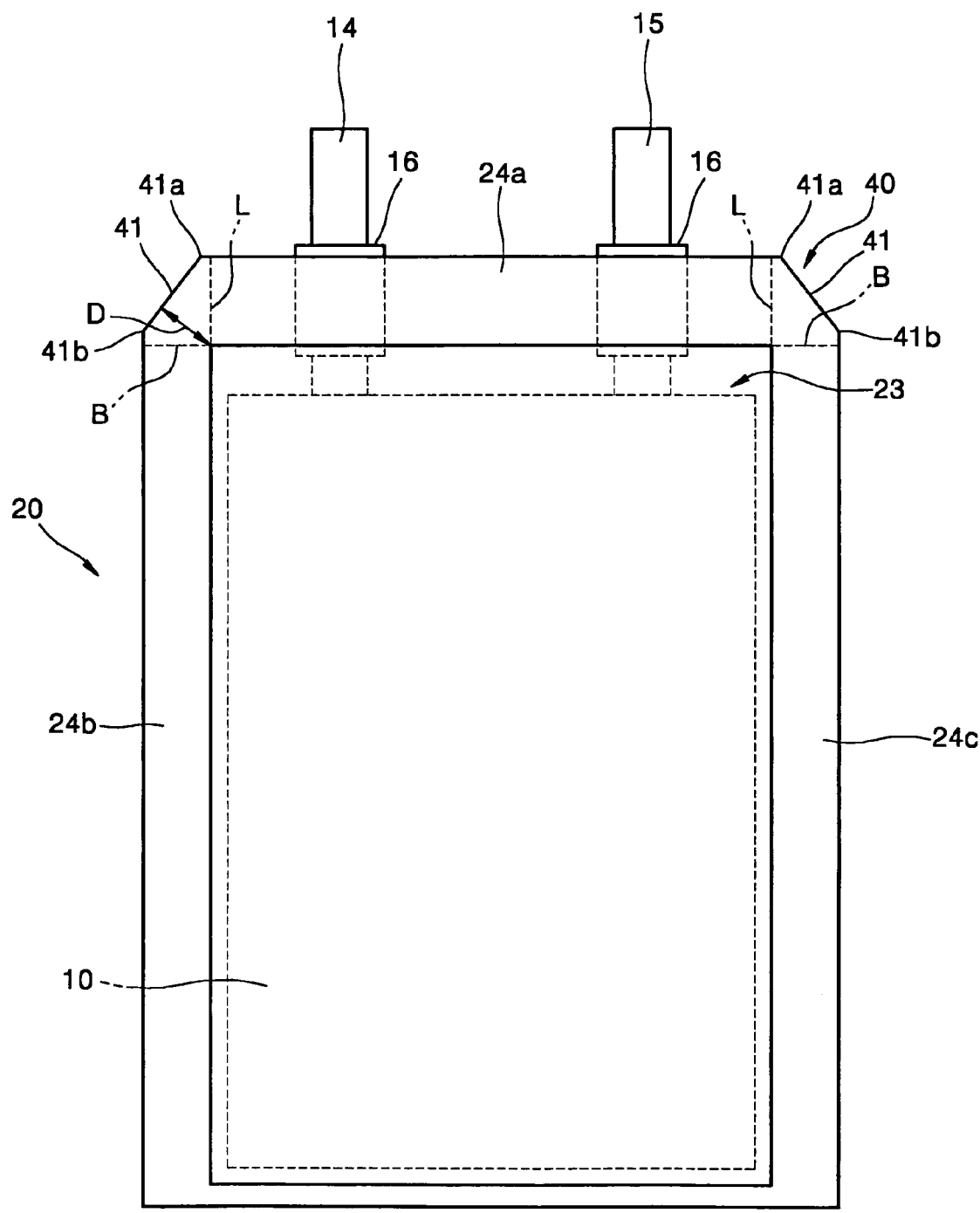
FIG. 5 is a plane view of the pouch type secondary battery shown in FIG. 3
Figure 6:
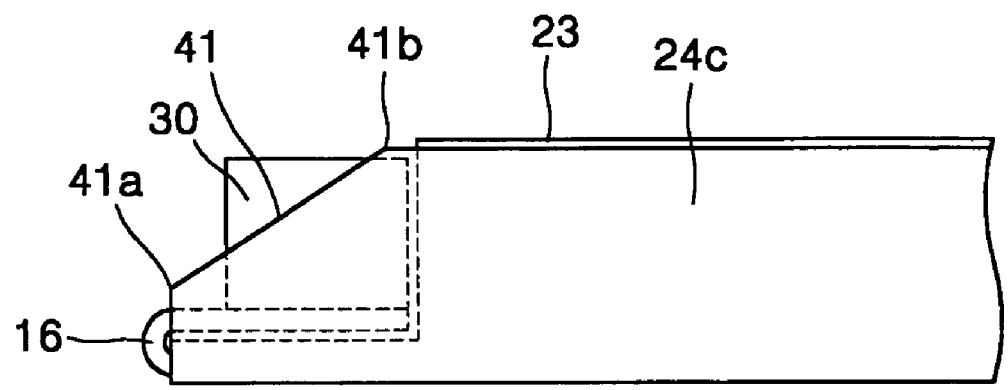
FIG. 6 is a partial side view of the pouch type secondary battery shown in FIG. 3.

FIG. 3 is an exploded perspective view of a pouch type secondary battery according to an embodiment of the present invention. FIGS. 4 through 6 are perspective, plane, and partial side views, respectively, of the pouch type secondary battery shown in FIG. 3.

As shown in FIGS. 3 through 6, the pouch type secondary battery according to an embodiment of the present invention includes an electrode assembly 10, in which a separator 13 is interposed between a first electrode plate 11 and a second electrode plate 12, and a pouch case 20 accommodating the electrode assembly 10. The electrode assembly 10 may be implemented by an electrode jelly role or a stack type electrode assembly.

The first and second electrode plates 11 and 12 in the electrode assembly 10 may be implemented by positive and negative plates, respectively, or negative and positive plates, respectively. The negative plate includes a negative current collector made of a metal foil, e.g., a copper foil, having a strip shape. At least one surface of the negative current collector is coated with a negative electrode mixture comprising a binder, a plasticizer, a conductive material or the like which may be mixed with a negative active material such as carbon. The positive plate includes a positive current collector made of a metal foil, e.g., an aluminum foil, having a strip shape. At least one surface of the positive current collector is coated with a positive electrode mixture comprising a binder, a plasticizer, a conductive material, or the like which may be mixed with a positive active material such as lithium oxide.

A separator is disposed between the negative plate and the positive plate, thereby forming a stack structure. The stack structure is then rolled, thereby forming an electrode assembly. The separator insulates the positive plate from the negative plate and allows ions of the active material to be exchanged between the positive and negative plates. Preferably, but not required, the separator is long enough to completely insulate the positive and negative plates from each other even when the electrode assembly contracts or expands. Electrode assemblies having any other structures can be adopted to the present invention.

A first electrode tab 14 and a second electrode tab 15 extend from the electrode assembly 10. The first and second electrode tabs 14 and 15 extend from the first and second electrode plates 11 and 12, respectively. The first electrode tab 14 may be a negative tab while the second electrode tab 15 is a positive tab. The first electrode tab 14 may be made of nickel or a nickel alloy, and the second electrode tab 15 may be made of aluminum or an aluminum alloy. The polarities of the first and second electrode tabs 14 and 15 may be differently configured from those described above. As shown in FIG. 3, a tab tape 16 is stuck to a predetermined portion on at least one surface of each of the first and second electrode tabs 14 and 15. The tab tape 16 is used to prevent a short circuit between the pouch case 20 and each of the first and second electrode tabs 14 and 15 and may be made of an insulating resin material having an adhesive surface.

The electrode assembly 10 is put in a container 23 of the pouch case 20. The pouch case 20 may include a case body 21 with a concave structure as the container 23 and a pouch cover 22 covering the case body 21 to seal the container 23. The pouch cover 22 may be formed by extending one edge of the case body 21. The pouch cover 22 is bonded to the case body 21 to hermetically seal the case body 21. In this situation, since an end of the pouch cover 22 is connected to the case body 21, three sealing portions 24a, 24b, and 24c may be formed, as shown in FIG. 5. The shape of the pouch case 20 is not restricted to this embodiment and may be changed in various ways.

As shown in FIG. 3, the pouch case 20 may include a core 22a made of a material such as aluminum and an insulation covering portion formed around the outside of the core 22a. The insulation covering portion may include a thermal adhesive layer 22b made of modified polypropylene, i.e., a polymer resin, for example, cast polypropylene (CPP), and a resin material 22c made of nylon or polyethylene terephtalate (PET) on the outer surface of the thermal adhesive layer 22b. However, the structure of the insulation covering portion is not restricted to this embodiment. In FIG. 3, the configuration of the core 22a and the insulation covering portion is shown only in the case cover 22, but it is also applied to the pouch body 21.

Meanwhile, the first and second electrode tabs 14 and 15 are exposed outside the pouch case 20. In this embodiment of the present invention, the first and second electrode tabs 14 and 15 may be exposed through a first sealing portion 24a positioned at the opposite to the portion where the case body 21 is connected to the pouch cover 22, as shown in FIG. 5.

Second and third sealing portions 24b and 24c positioned at the opposite sides, respectively, of the first sealing portion 24a are folded at least one time toward the side of the case body 21 in order to reduce the volume of a package. In the embodiments of the present invention shown in FIGS. 4 through 12, the second and third sealing portions 24b and 24c are folded one time along the folding lines L extending from the opposite edges, respectively, of the container 23 and then brought into close contact with the opposite sides, respectively, of the case body 21.

As shown in FIG. 3, a protective circuit module 30 is coupled to the pouch type secondary battery having the above-described structure. The protective circuit module 30 includes a substrate 31 having a surface 34 onto which a circuit is printed, a first terminal 32, and a second terminal 33. Various electronic parts 35 are mounted on the substrate 31. The first and second electrode tabs 14 and 15 exposed outside the pouch case 20 are connected to the first and second terminals 32 and 33, respectively. The protective circuit module 30 is mounted on the first sealing portion 24a, as shown in FIGS. 4 and 6.

In one of the embodiments of the present invention, a short circuit protector 40 is further provided to prevent an electric short circuit caused by an electrical contact between the ends of the sealing portions 24a, 24b, and 24c and the protective circuit module 30. The short circuit protector 40 includes cut portions 41 provided between the first sealing portion 24a and the second sealing portion 24b and between the first sealing portion 24a and the third sealing portion 24c. The cut portions 41 may be formed by cutting the corners between the first sealing portion 24 and the second and third sealing portions 24b and 24c such that the first through third sealing portions 24a through 24c do not electrically contact the protective circuit module 30. The cut portions 41 are formed after the pouch cover 22 and the case body 21 are put together.

As shown in FIG. 5, the cut portions 41 are formed such that the corners approach the center of the pouch case 20. At least one of the cut portions 41 may be formed to be inclined with respect to the lengthwise direction of the pouch case 20.

As shown in FIG. 5, the cut portions 41 may be positioned outside the folding lines L, along where the second and third sealing portions 24b and 24c are folded. In this situation, a minimum distance D between each cut portion 41 and the container 23 can be increased, thereby securing the necessary tightness for sealing the container. As shown in FIG. 6, after the second and third sealing portions 24b and 24c are folded, the ends of the cut portion 41 face in a direction parallel to the protective circuit module 30. As a result, even if a metal core is exposed at the ends of the cut portion 41, an electrical short circuit between the core and the protective circuit module 30 will not occur.

Figure 7:
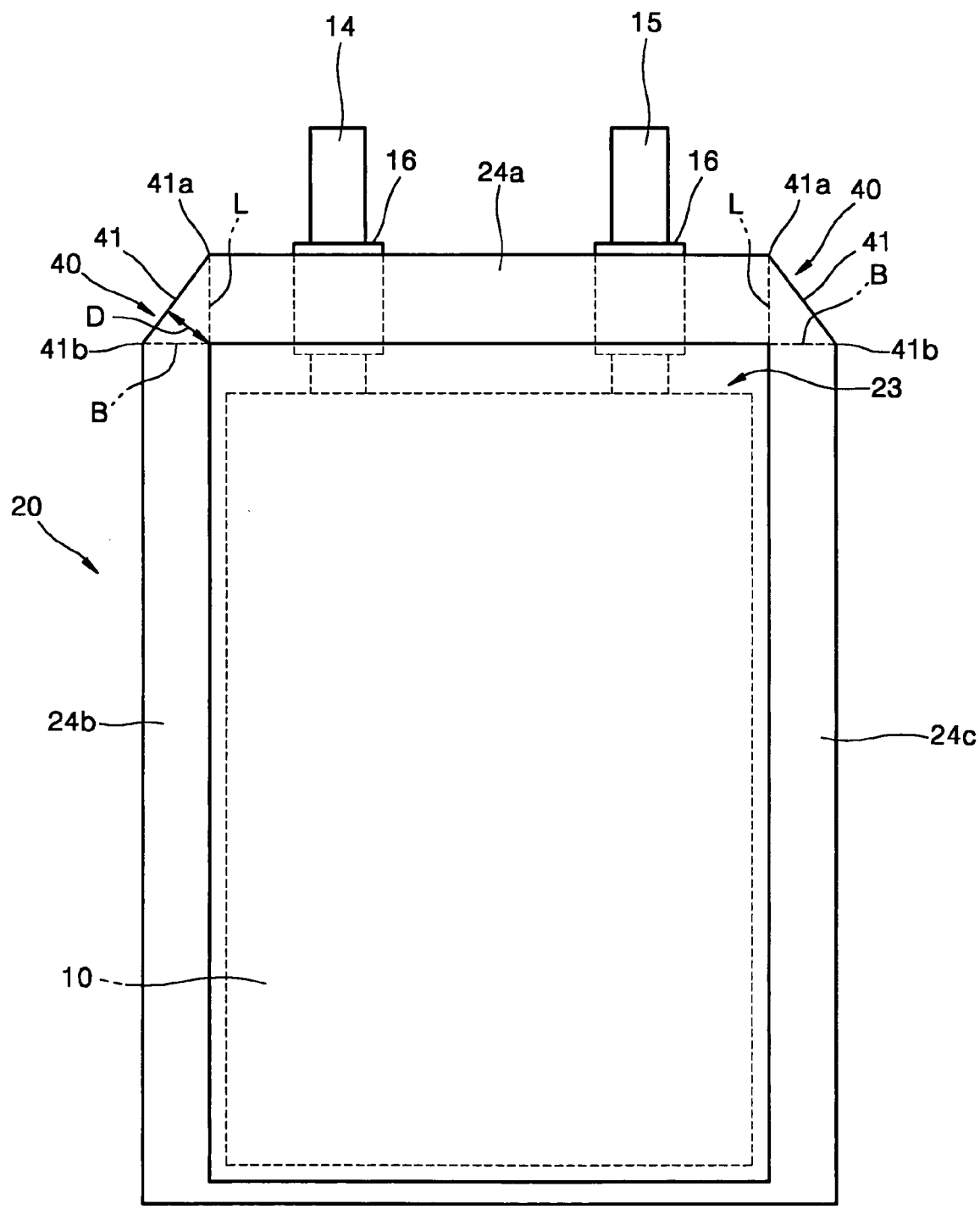
FIG. 7 is a plane view of a pouch type secondary battery according to another embodiment of the present invention.

Meanwhile, the likelihood of an electrical contact between the ends of the cut portions 41 and the protective circuit module 30 which might occur after the second and third sealing portions 24b and 24c are folded can be further decreased by adjusting the positions of an end 41a and an end 41b of each cut portion 41. In other words, as shown in FIG. 7, the end 41a of each cut portion 41 may be positioned in at least the first sealing portion 24a. Here, the end 41a may be positioned near each of the borders between the first sealing portion 24a and the second and third sealing portions 24b and 24c, i.e., the folding lines L along which the second and third sealing portions 24b and 24c are respectively folded. Although not shown, the end 41a of each cut portion 41 may be positioned to the right or left of each folding line L, towards a midpoint of the first sealing portion 24a. The ends 41b of the respective cut portions 41 are positioned in the second and third sealing portions 24b and 24c, respectively. Here, the ends 41b may be positioned towards the container 23. In other words, the ends 41b may be positioned on an extended border line B between the first sealing portion 24a and the container 23 or in portions towards midpoints of the second and third sealing portions 24b and 24c, respectively.

Figure 8:
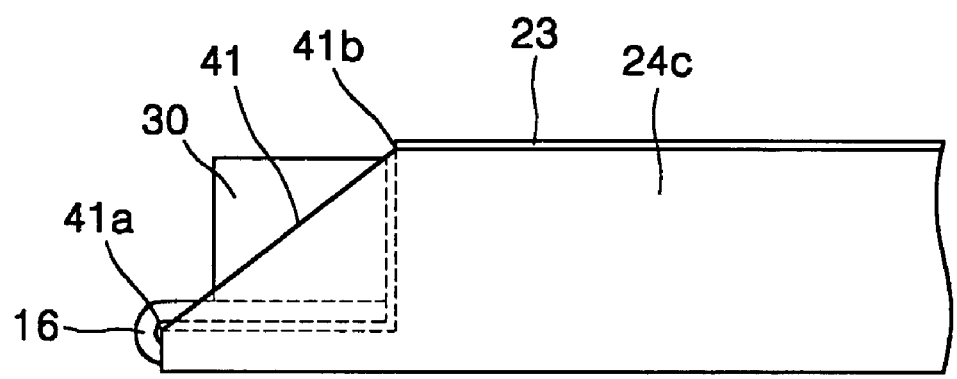
FIG. 8 is a partial side view of the pouch type secondary battery shown in FIG. 7.

When the positions of the end 41a and the end 41b of each cut portion 41 are adjusted as described above, a likelihood of an electrical contact between the cut portions 41 and the protective circuit module is eliminated, as illustrated in FIG. 8. In other words, the portions of the sealing portions 24a, 24b, and 24c overlapping the protective circuit module 30 are minimized, thereby decreasing a likelihood that the sealing portions 24a through 24c are crushed when the pouch type secondary battery is packaged into an external pack. Accordingly, the sealing portions 24a through 24b are prevented from contacting electronic parts mounted on the protective circuit module 30 or a printed circuit on the protective circuit module 30. Consequently, an electrical short circuit can be prevented.

In order to prevent an electrical contact between the cut portions 41 and the protective circuit module 30 by adjusting the positions of the ends 41a and the ends 41b of the cut portions 41, the pouch case 20 may also be structured as follows.

Figure 9:
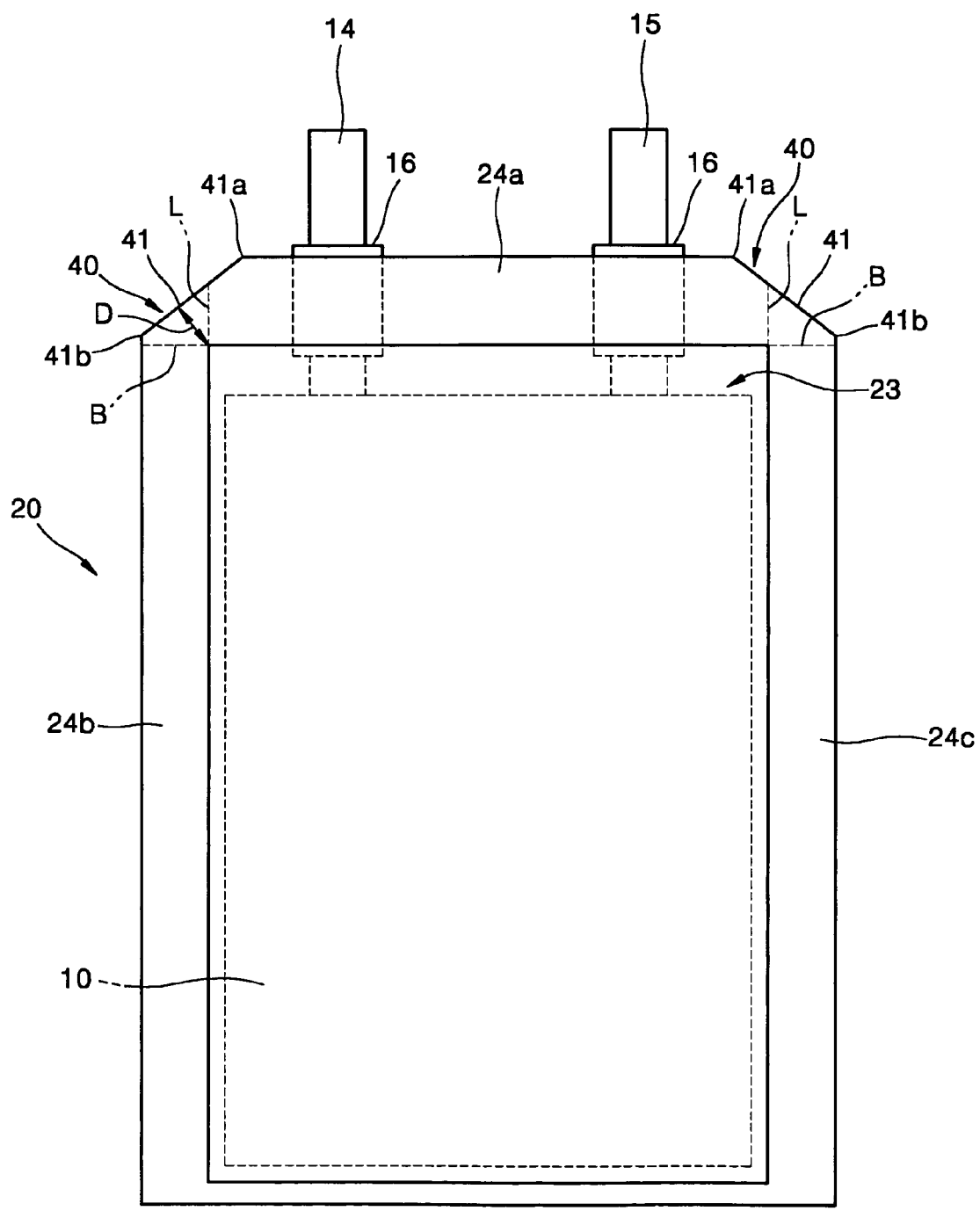
FIG. 9 is a plane view of a pouch type secondary battery according to still another embodiment of the present invention.
Figure 10:
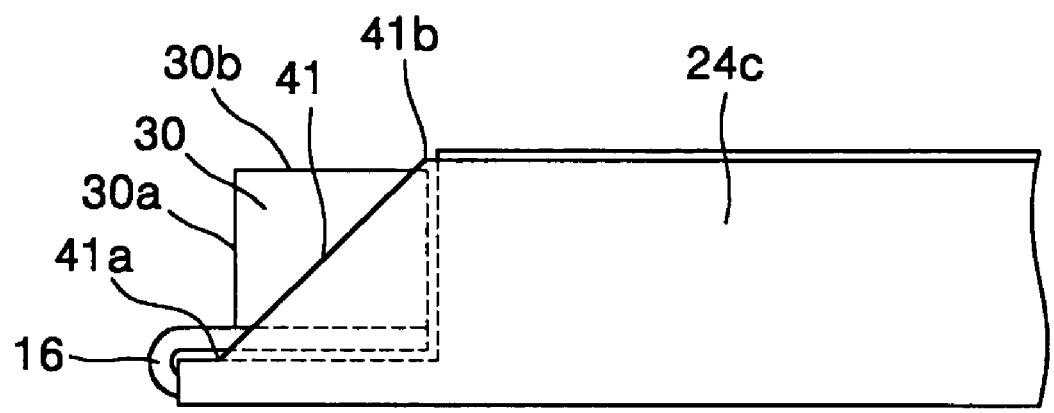
FIG. 10 is a partial side view of the pouch type secondary battery shown in FIG. 9.

When an electrical circuit pattern and electronic parts are formed on a side portion 30a of the protective circuit module 30, as shown in FIG. 10, the ends 41a of the respective cut portions 41 may be moved from the respective folding lines L toward the center of the first sealing portion 24a, and the ends 41b may be vertically moved from the extended border line B toward the outer end of the first sealing portion 24a, as shown in FIG. 9. In this structure, as shown in FIG. 10, the ends 41b of the cut portion 41 interfere with the protective circuit module 30. However, since the electronic parts and the circuit are formed on the side portion 30a of the protective circuit module 30, the electrical contact between the cut portions 41 and the protective circuit module 30 does not occur. Here, the ends 41b of the cut portions 41 may also be positioned near the extended border line B.

Figure 11:
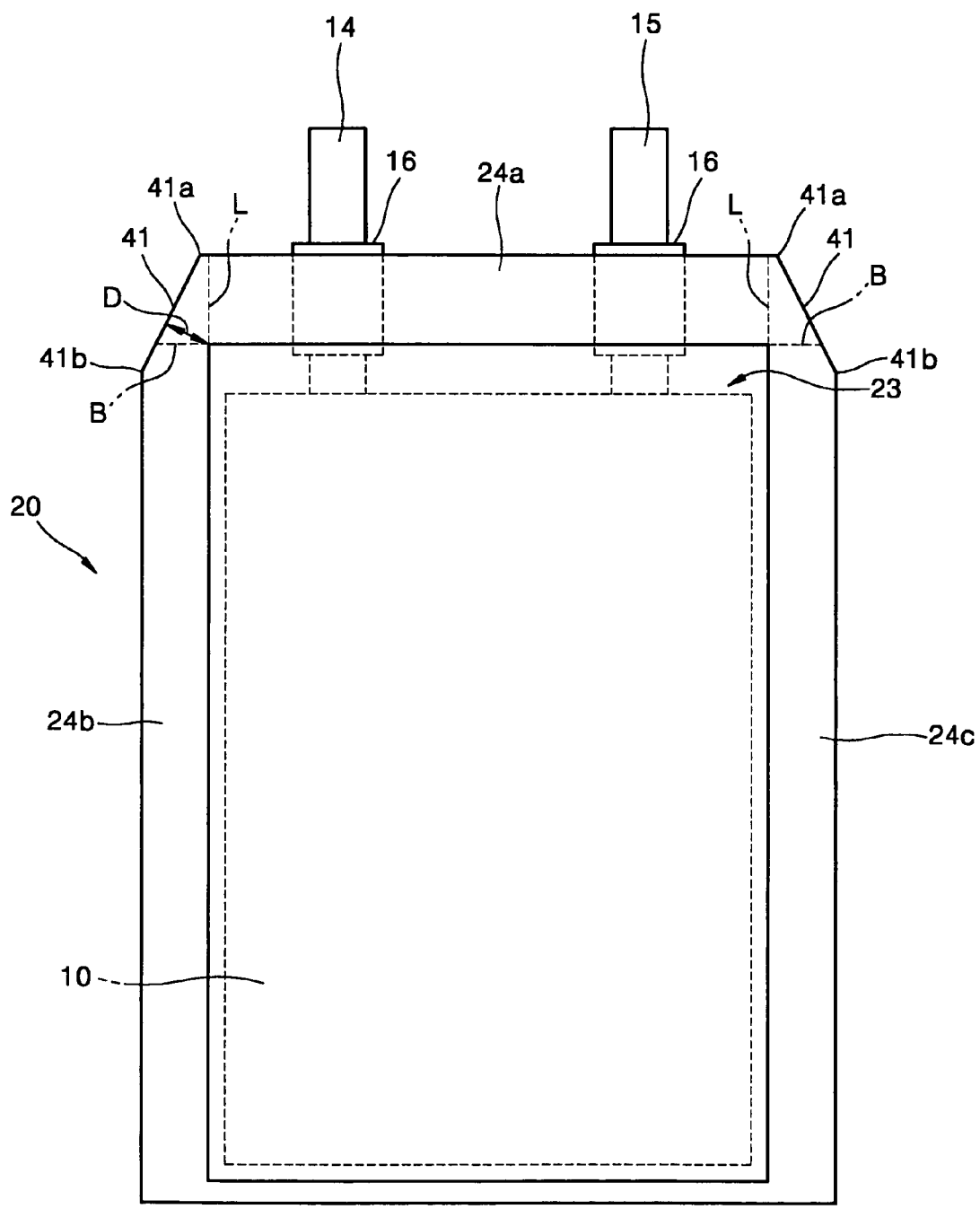
FIG. 11 is a plane view of a pouch type secondary battery according to still another embodiment of the present invention.
Figure 12:
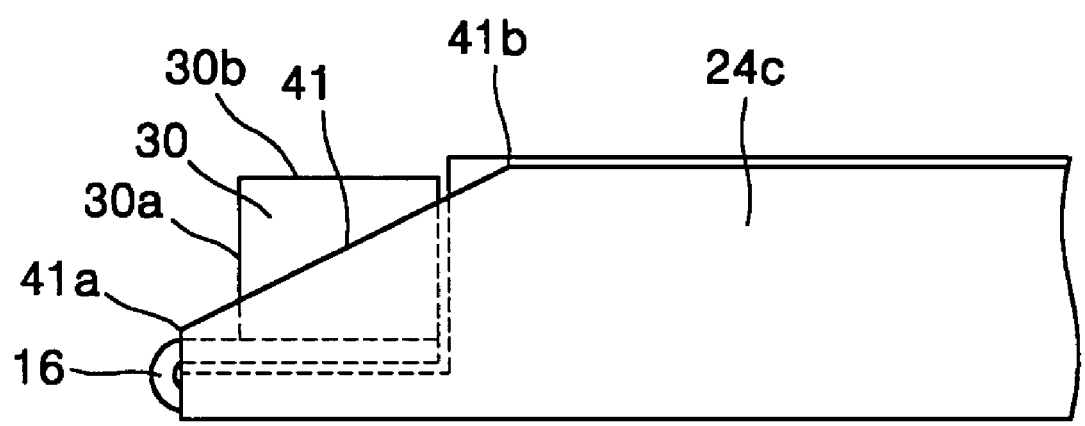
FIG. 12 is a partial side view of the pouch type secondary battery shown in FIG. 11.

Meanwhile, when an electrical circuit pattern and electronic parts are formed on a top portion 30b of the protective circuit module 30, as shown in FIG. 12, the ends 41a of the cut portions 41 may be moved outward from each folding line L, and the ends 41b may be moved from the extended border line B toward the centers of the second and third sealing portions 24b and 24c, respectively, as shown in FIG. 11. In this structure, as shown in FIG. 12, the ends 41a of the cut portions 41 interfere with the protective circuit module 30. However, since the electronic parts and the circuit are formed on the top portion 30b of the protective circuit module 30, an electrical contact between the cut portions 41 and the protective circuit module 30 does not occur. Here, the ends 41b of the cut portions 41 may also be positioned near the extended border line B.

Figure 13:
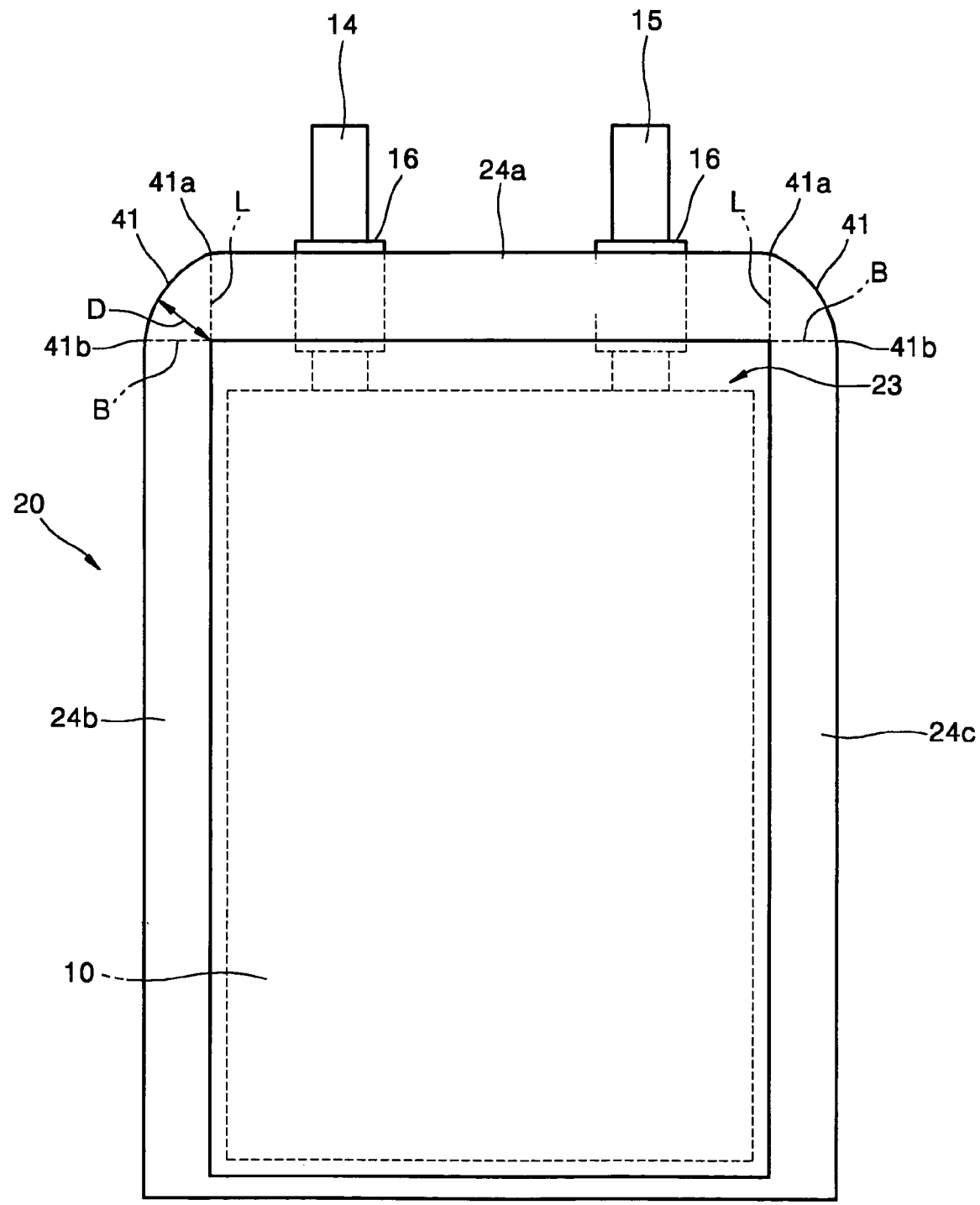
FIG. 13 is a plane view of a pouch type secondary battery according to still another embodiment of the present invention.
Figure 14:
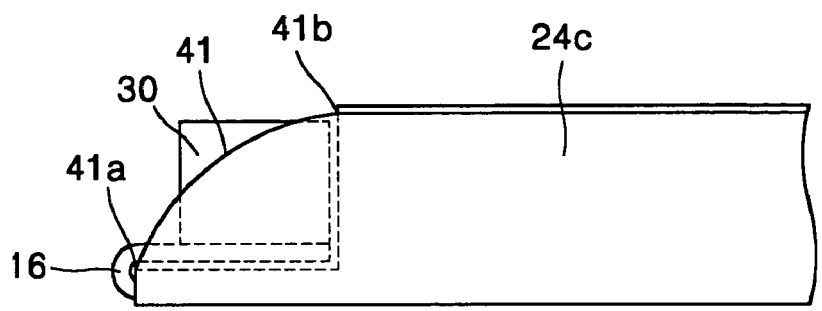
FIG. 14 is a partial side view of the pouch type secondary battery shown in FIG. 13.

In the above-described embodiments, the cut portions 41 have a straight cut, but the present invention is not restricted thereto. The cut portions 41 may have any shape that prevents the electrical contact between the protective circuit module 30 and the cut portions 41. For example, as shown in FIGS. 13 and 14, at least one cut portion 41 may be curved. In this case, the curved cut portion 41 may be a single circular arc or may be formed of at least two circular arcs having different radii. Here, the one and the ends 41a and 41b of each cut portion 41 may be located as described above with respect to the straight cut portions 41.

When the cut portions 41 are curved, as shown in FIGS. 13 and 14, the minimum distance D between each cut portion 41 and the container 23 can be increased so that a satisfactory sealing tightness can be secured and an electrical contact between the protective circuit module 30 and the cut portions 41 can also be prevented.

Alternatively, the cut portion 41 may have a step form, a concave form, or a convex form. Due to this cut portion 41, freedom in packaging design can be increased when a pouch type secondary battery of the present invention is packaged into an external pack (not shown) having a rounded edge. In other words, the external pack having a rounded edge usually interferes with the corners of folded sealing portions. In this situation, if a pouch type secondary battery has the above-described cut portions, the pouch type secondary battery does not interfere with the external pack.

In addition, due to the cut portions 41, the width of the first sealing portion 24a can be decreased. Recently, with the miniaturization of protective circuits such as the protective circuit module 30, the width of the first sealing portion 24a is decreased to the reduced volume of the battery, or a space in the pouch case 20 is increased to the increase in a capacity of the battery. In the present invention, the corners of the sealing portions 24a through 24c can be prevented from protruding outside by using the cut portions 41. As a result, the width of the first sealing portion 24a can be reduced. Consequently, the entire volume of the battery can be reduced, or a space in the battery can be increased, thereby increasing the capacity of the battery.

Meanwhile, as shown in FIGS. 5 through 14, the cut portions 41 can function as a safety valve by adjusting the minimum distance D between each cut portion 41 and the container 23. In other words, when a pouch type secondary battery is overcharged or overdischarged or is used under adverse conditions, a gas is generated due to a temperature increase within the pouch type secondary battery. Particularly, in case of a lithium secondary battery, this situation may be very dangerous, since the battery may explode and hurt a user. Accordingly, it is necessary to exhaust the gas from the battery when the inner pressure of the battery exceeds a predetermined limit. In one of the embodiments of the present invention, a safety valve in a pouch type secondary battery is implemented by adjusting the minimum distance D between each cut portion 41 and the container 23. The minimum distance D between each cut portion 41 and the container 23 is set such that the cut portion 41 easily breaks when the pouch type secondary battery has an internal pressure of 2 through 20 atmospheres, and preferably, of 4 through 8 atmospheres. Here, it will be apparent that the minimum distance D is greater than a minimum length for achieving a sealing effect.

Figure 15:
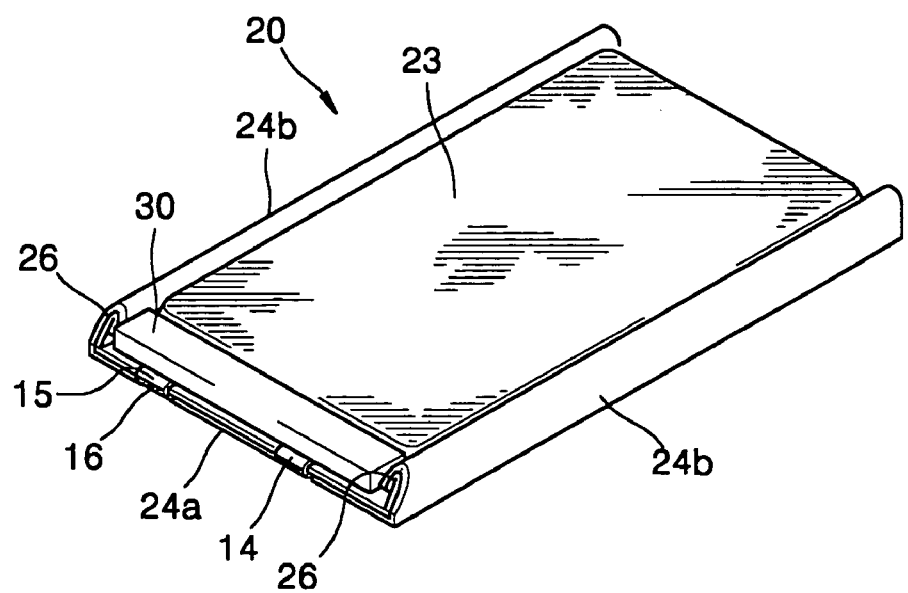
FIG. 15 is a perspective view of a pouch type secondary battery according to embodiments of the present invention, in which second and third sealing portions are folded two times.
Figure 16:
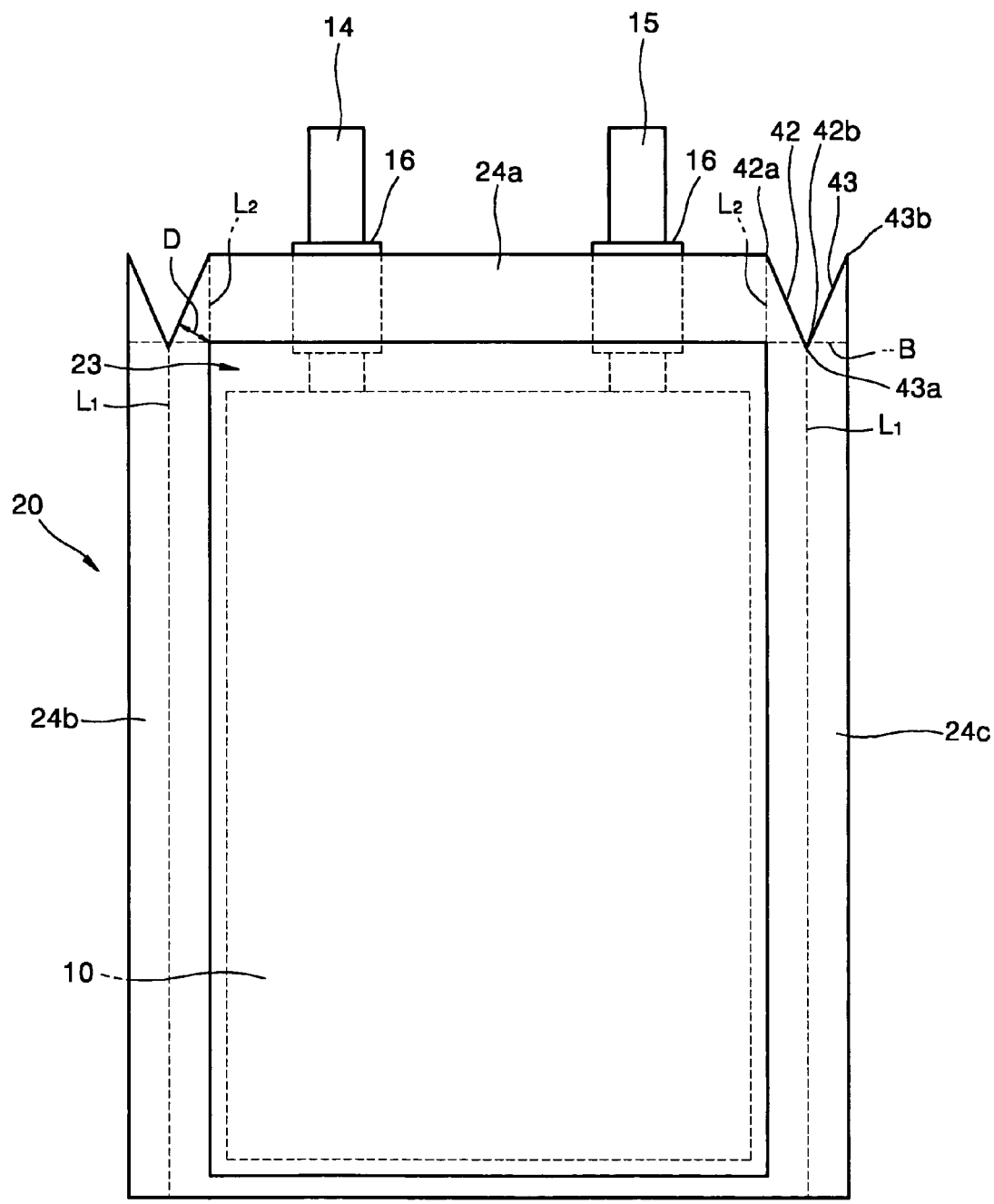
FIGS. 16 through 18 are plane views of examples of the pouch type secondary battery shown in FIG. 15.

In the above-described embodiments of the present invention, the second and third sealing portions 24b and 24c are folded one time. However, the present invention is not restricted thereto. As shown in FIGS. 15 and 16, the second and third sealing portions 24b and 24c may be folded two times.

As shown in FIG. 16, a first folding line $L_1$ is formed in each of the second and third sealing portions 24b and 24c, and a second folding line $L_2$ is formed inward from the first folding line $L_1$. A first cut portion 42 and a second cut portion 43 are formed at each corner of the first through third sealing portions 24a through 24c.

The first cut portion 42 has an end 42a positioned in the first sealing portion 24a or in a portion extended from the first sealing portion 24a, i.e., a portion between the first sealing portion 24a and each of the second and third sealing portions 24b and 24c, and an end 42b positioned on the first folding line $L_1$. The second cut portion 43 has an end 43a positioned on the first folding line $L_1$ and an end 43b positioned at an outer edge of each of the second and third sealing portions 24b and 24c.

As shown in FIG. 15, the first and second cut portions 42 and 43 are formed by folding the second and third sealing portions 24b and 24c two times so that the second and third sealing portions 24b and 24c closely contact the sidewalls of the container 23, and then by cutting the corner between the first sealing portion 24a and each of the second and third sealing portions 24b and 24c. When the second and third sealing portions 24b and 24c are unfolded, the pouch case 20 has a shape as shown in FIG. 16. In this embodiment, the end 42b of the first cut portion 42 exactly meets the end 43a of the second cut portion 43, and the first and second cut portions 42 and 43 are symmetric.

The end 42a of the first cut portion 42 may be positioned near the second folding line $L_2$, and the end 42b of the first cut portion 42 may be positioned near the extended border line B. Since the first and second cut portions 42 and 43 are symmetric, the end 43a of the second cut portion 43 is positioned near the extended border line B. If both ends of the first and second cut portions 42 and 43 are defined as described above, the pouch type secondary battery has a side view as shown in FIG. 6 when the second and third sealing portions 24b and 24c are folded. Accordingly, the edges of the first and second cut portions 42 and 43 do not electrically contact the protective circuit module 30.

Although not shown, to obtain the side view shown in FIG. 8, the end 42a of the first cut portion 42 may be positioned on the second folding line $L_2$, and the end 42b of the first cut portion 42 may be positioned on the extended border line B. Here, the first and second cut portions 42 and 43 are symmetric.

As described above, various side views as shown in FIGS. 10 and 12 can be obtained by adjusting the positions of the end 42a and the end 42b of the first cut portion 42 and making the first and second cut portions 42 and 43 symmetric.

Figure 17:
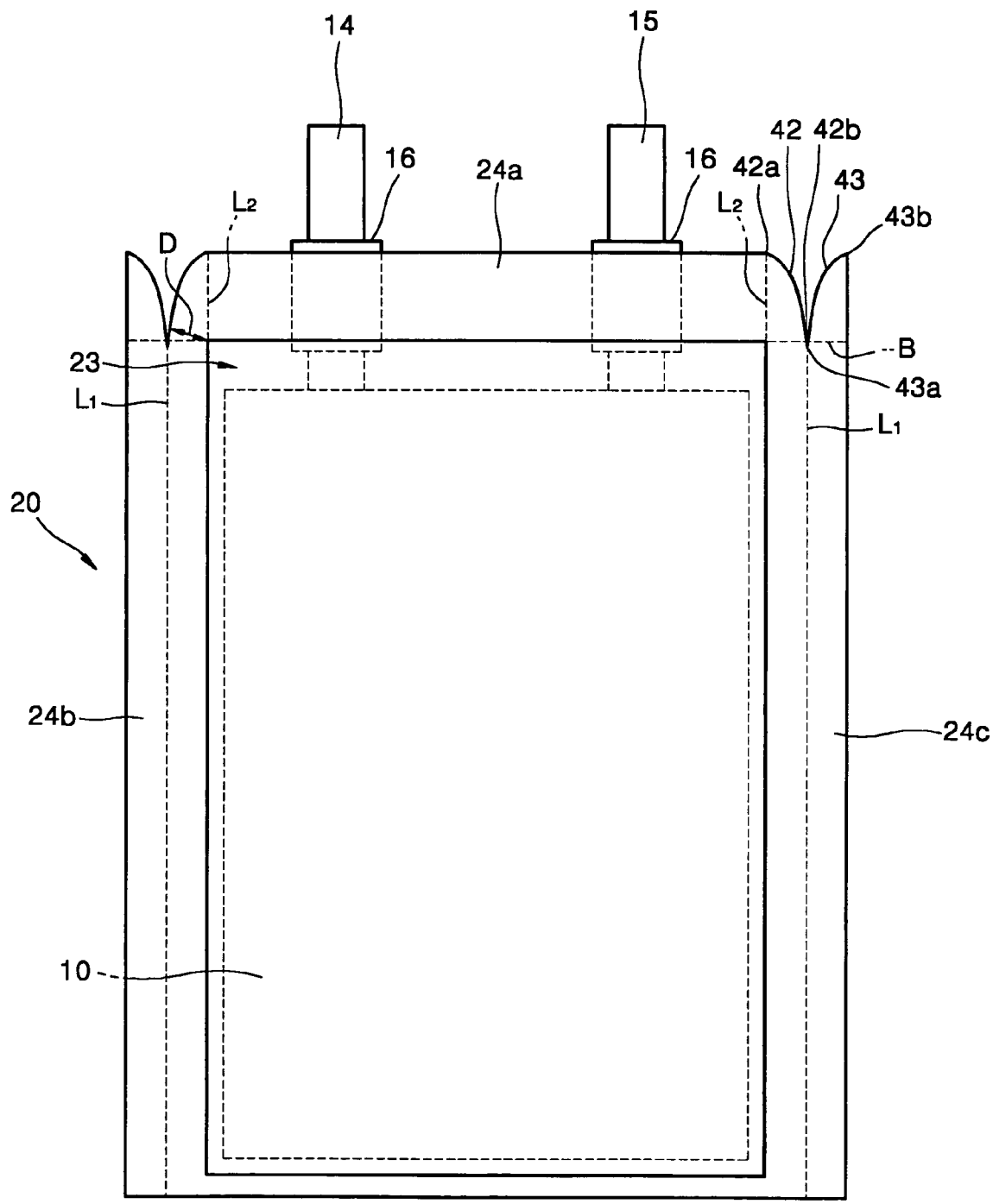

In another embodiment, the first and second cut portions 42 and 43 may be formed in a curve shape, as shown in FIG. 17. Features regarding the curve are the same as those disclosed above, and thus a detailed description thereof will be omitted.

Figure 18:
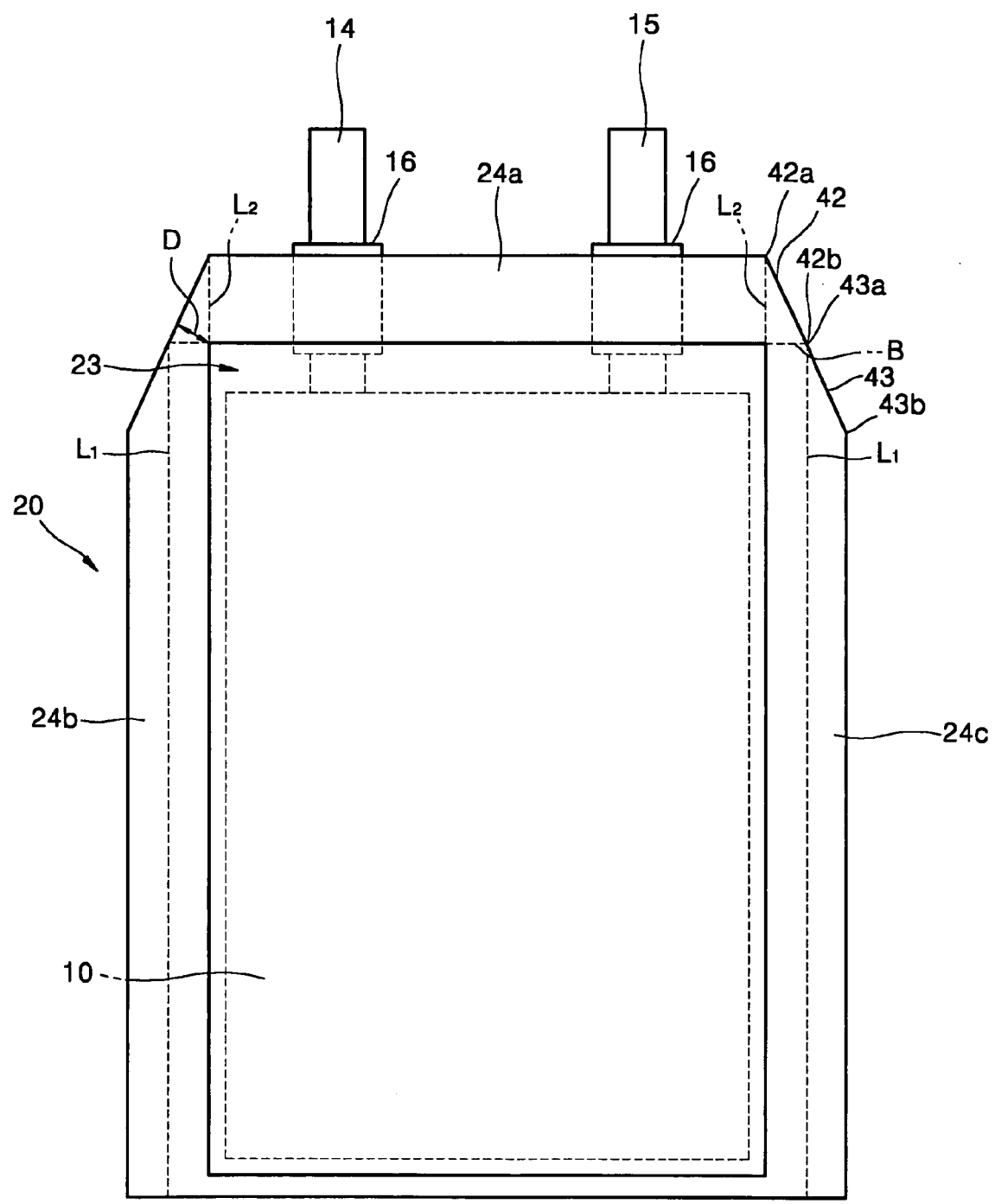

In embodiments, the first and second cut portions 42 and 43 may not be symmetric. More specifically, as shown in FIG. 18, the corner between the first sealing portion 24a and each of the second and third sealing portions 24b and 24c may be cut such that the first cut portion 42 continues toward the second cut portion 43. Thereafter, the second and third sealing portions 24b and 24c are folded along the first and second folding lines $L_1$ and $L_2$. Here, both ends of the first cut portion 42 may be formed as described with reference to FIGS. 5, 7, 9, and 11. Here, the end 43a of the second cut portion 43 meets the end 42b of the first cut portion 42, and the end 43b of the second cut portion 43 may be positioned at any point on the side edge of each of the second and third sealing portions 24b and 24c. When the first and second cut portions 42 and 43 are formed as described above, a side view of a pouch type secondary battery of the present invention after the second and third sealing portions 24b and 24c are folded two times is as shown in FIGS. 6, 8, 10, and 12. Accordingly, an electrical contact between the first and second cut portions 42 and 43 and the protective circuit module 30 can be prevented.

Figure 19:
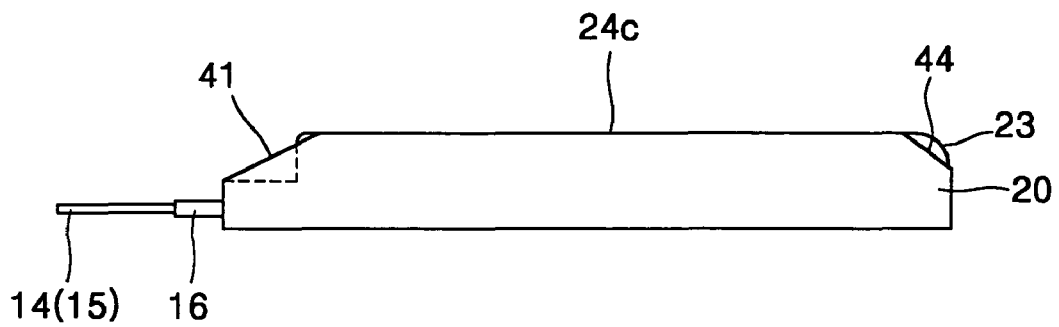
FIG. 19 is a side view of a pouch type secondary battery having an auxiliary cut portion according to an embodiment of the present invention.

In the present invention, the cut portions may be formed only at the corners between the first sealing portion 24a and the second and third sealing portions 24b and 24c. Alternatively, as shown in FIG. 19, an auxiliary cut portion 44 may be additionally formed at an opposite corner of each of the second and third sealing portions 24b and 24c, located at a side opposite the first sealing portion 24a. The auxiliary cut portion 44 may have a shape corresponding to an inner shape of an external pack, into which a pouch type secondary battery of the present invention is packaged, so that interference with the external pack can be prevented, and therefore, multiple packaging designs are possible.

Figure 20:
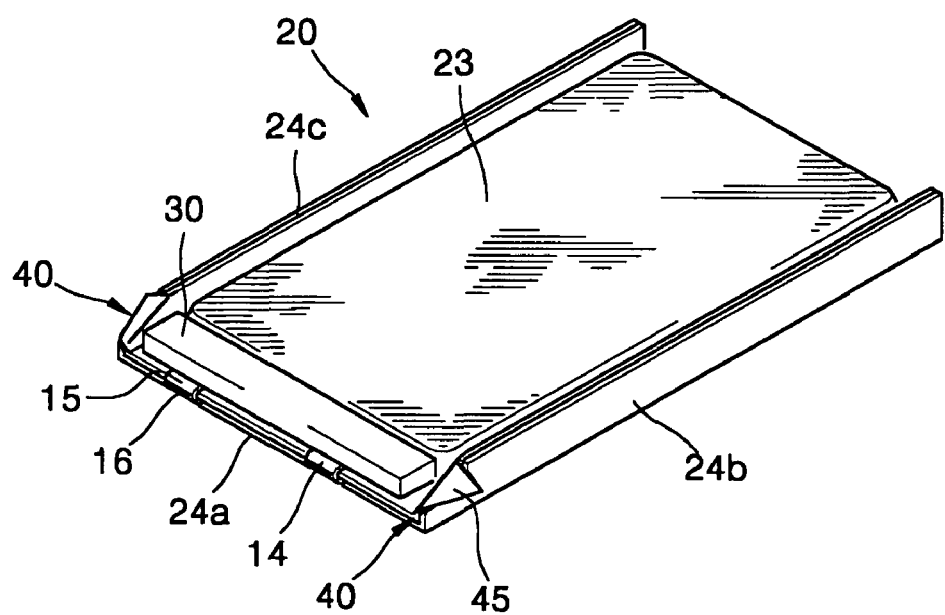
FIG. 20 is a perspective view of a pouch type secondary battery having a folded portion according to another embodiment of the present invention.
Figure 21:
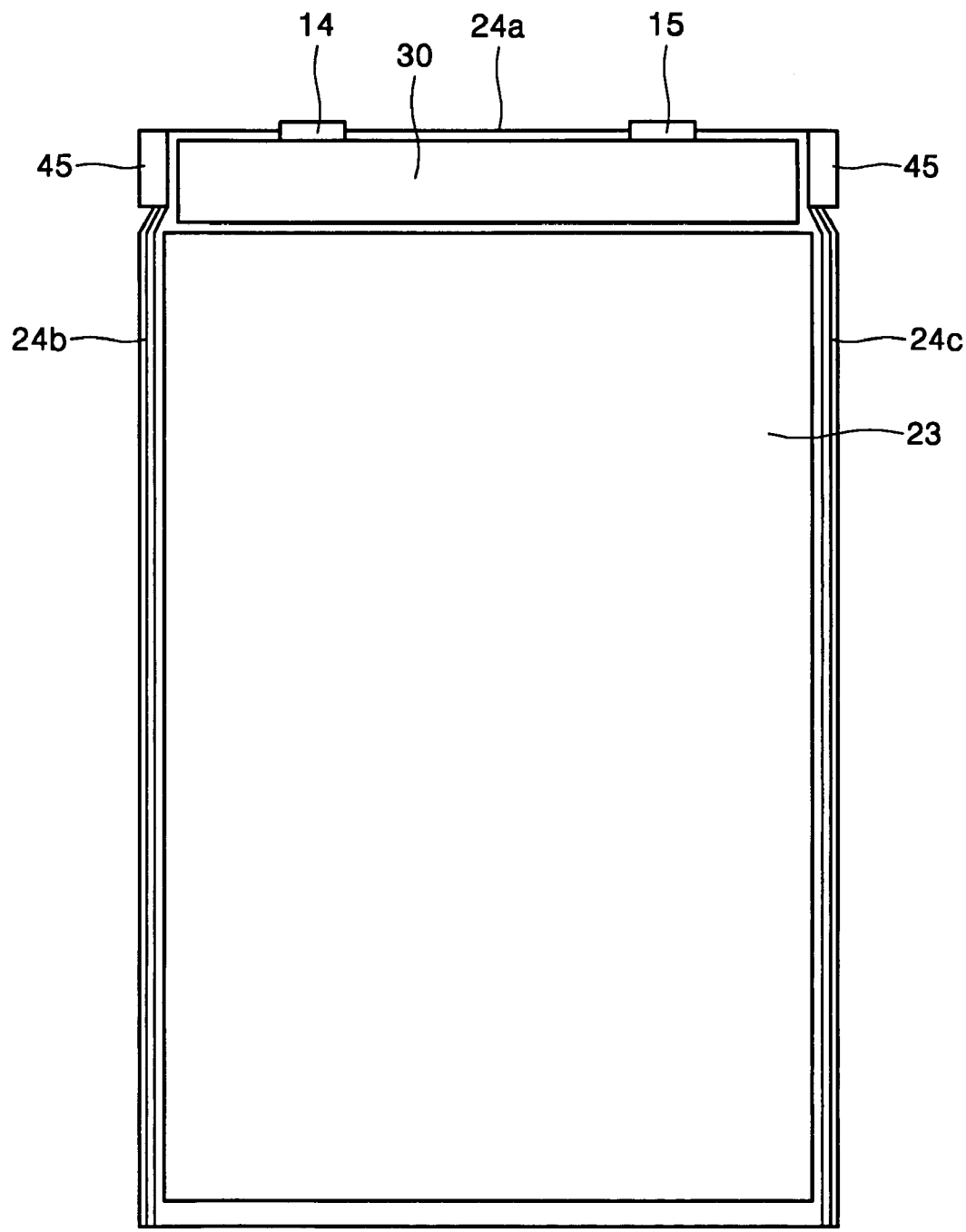
FIG. 21 is a plane view of the pouch type secondary battery shown in FIG. 20.

In another embodiment of the present invention, as shown in FIGS. 20 and 21, the short circuit protector 40 may include a folded portion 45 formed by folding the corner between the first sealing portion 24a and each of the second and third sealing portions 24b and 24c away from the container 23. As shown in FIG. 20, when the second and third sealing portions 24b and 24c are folded toward the opposite sides of the pouch case 20, i.e., toward the container 23, the corners between the first sealing portion 24a and the second and third sealing portions 24b and 24c are folded outward forming the folded portions 45 preventing the corners from interfering with the protective circuit module 30.

When the short circuit protector 40 includes the folded portions 45, the protective circuit module 30 is radically separated from a metal material that may be exposed at an edge of the sealing portions 24a through 24c, thereby reliably preventing a short circuit. In addition, sealing tightness can be guaranteed to a maximum extent. Moreover, as shown in FIG. 21, even when the folded portions 45 are formed as described above, the whole width of the pouch type secondary battery of the present invention does not increase much after the protective circuit module 30 is mounted on the first sealing portion 24a. Accordingly, no problems occur when the pouch type secondary battery is packaged into an external pack.

The auxiliary cut portion 44 shown in FIG. 19 may be formed in the embodiment shown in FIGS. 20 and 21 in the same manner.

Figure 22:
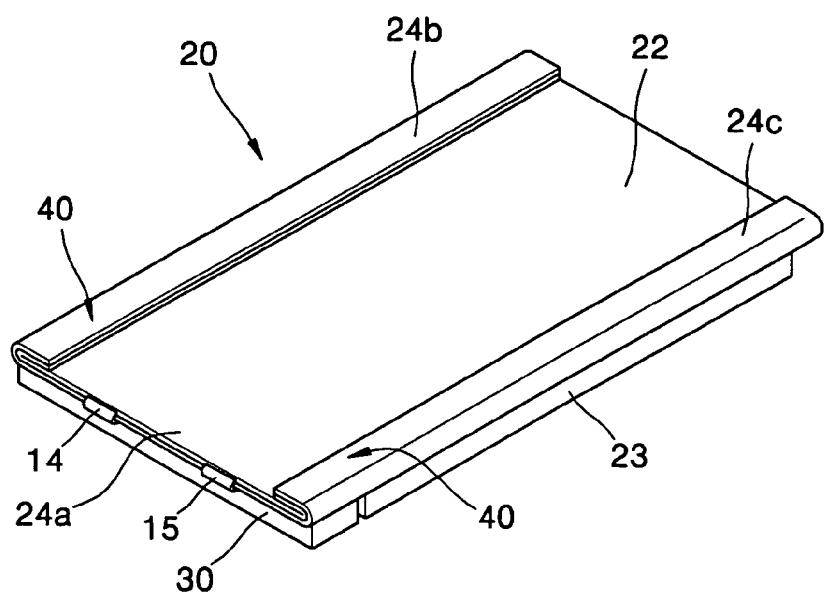
FIG. 22 is a perspective view of a pouch type secondary battery having second and third sealing portions folded toward a pouch cover according to still another embodiment of the present invention.
Figure 23:
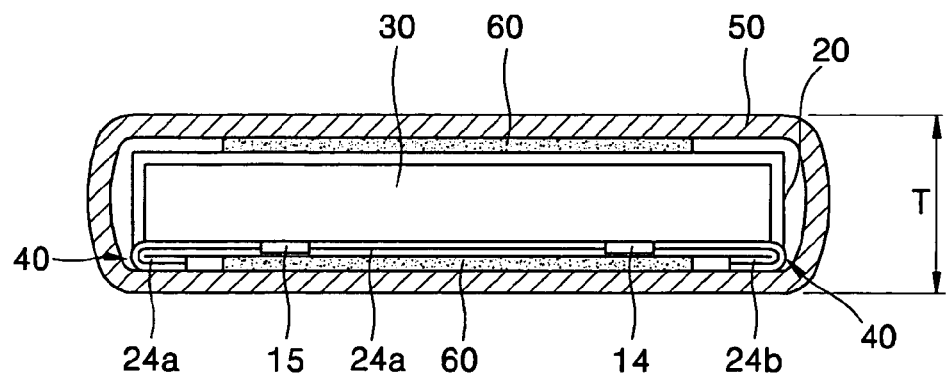
FIG. 23 is a cross-section of the pouch type secondary battery shown in FIG. 22, which is packaged into an external pack.

FIGS. 22 and 23 illustrate a pouch type secondary battery according to another embodiment of the present invention. In this embodiment, the second and third sealing portions 24b and 24c are folded toward a surface of the pouch case 20 opposite to the protective circuit module 30 mounted on the first sealing portion 24a, i.e., the outer surface of the pouch cover 22. In this situation, the short circuit protector 40 includes the folded portions of the second and third sealing portions 24b and 24c. Folding lines along which the second and third sealing portions 24b and 24c are respectively folded are parallel with the sides of the pouch case 20, that is, the folding lines and the respective opposite sides of the container 23 are lined up, so that the volume of the pouch type secondary battery of the present invention is minimized. It is preferable, but not required, that the second and third sealing portions 24b and 24c are folded one time to minimize the volume of the pouch type secondary battery.

As described above, when the short circuit protector 40 is formed by folding the second and third sealing portions 24b and 24c toward the outer surface of the pouch cover 22, the edges of the sealing portions 24a through 24c never contact the protective circuit module 30. As a result, a short circuit and corrosion caused by contact between the edges of the sealing portions 24a through 24c and the protective circuit module 30 can be completely prevented.

When the short circuit protector 40 is formed by folding the second and third sealing portions 24b and 24c toward the outer surface of the pouch cover 22, the volume, and more specifically, the thickness of the pouch type secondary battery of the present invention may increase. However, this problem can be solved when the pouch type secondary battery is packaged into an external pack 50, as shown in FIG. 23. When the pouch type secondary battery shown in FIG. 22 is packaged into the external pack 50, as shown in FIG. 23, an adhesive member 60 such as a two-sided tape is interposed between the external pack 50 and the pouch case 20. When the adhesive member 60 is positioned between the folded portions of the respective second and third sealing portions 24b and 24c on the bottom of the pouch case 20, as shown in FIG. 23, the folded portions of the second and third sealing portions 24b and 24c do not increase an overall thickness T of the external package 50. Accordingly, the folded portions of the second and third sealing portions 24b and 24c do not increase a packaging size.

Figure 24:
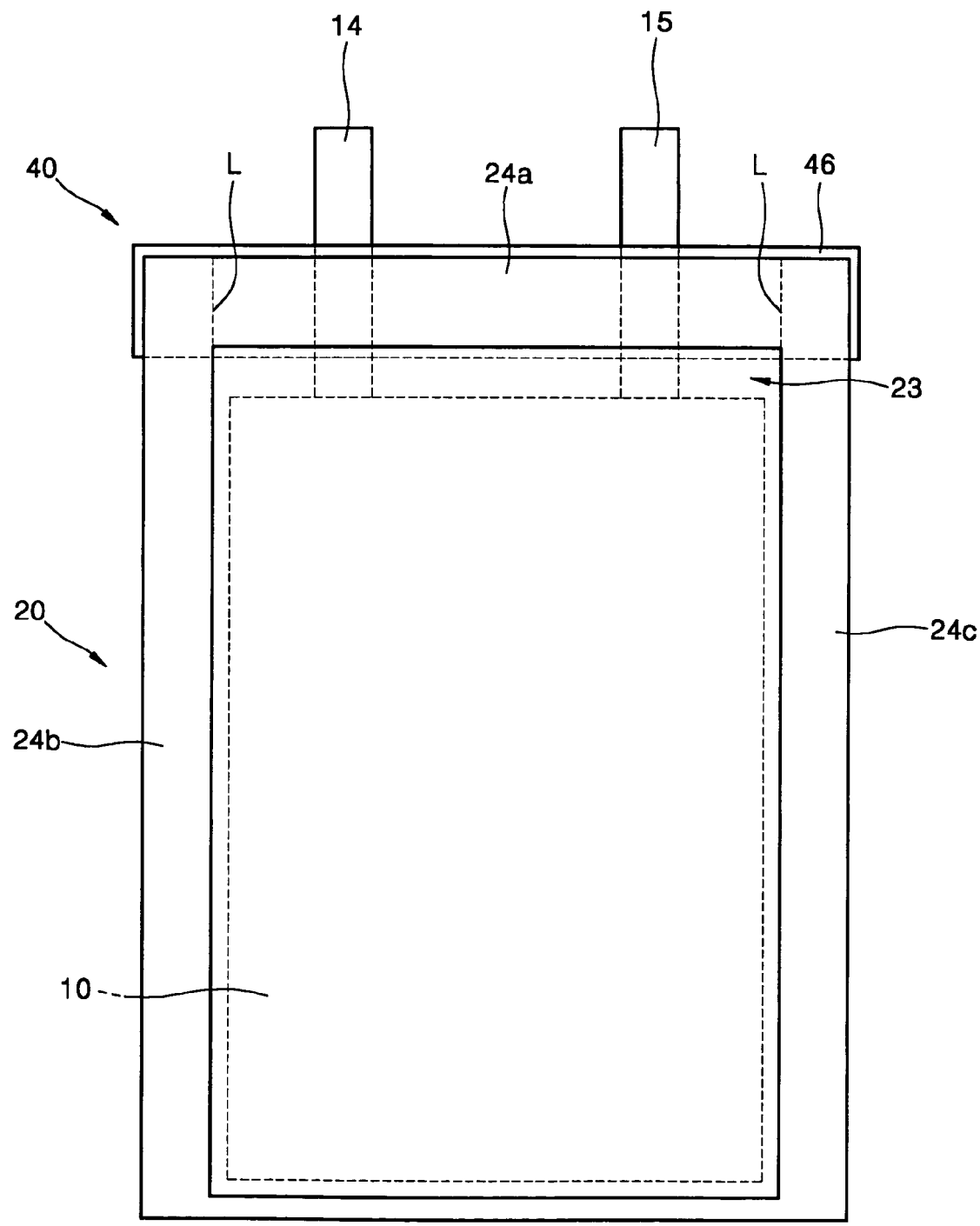
FIG. 24 is a plane view of a pouch type secondary battery having an insulation tape according to an embodiment of the present invention.

In still another embodiment of the present invention, the short circuit protector 40 may include an insulating tape 46 interposed between upper and lower parts of the first sealing portion 24a, as shown in FIG. 24. Referring to FIG. 24, the insulating tape 46 may extend from the first sealing portion 24a to the second and third sealing portions 24b and 24c. Preferably, but not required, the insulating tape 46 may extend beyond a corner where the first sealing portion 24a overlaps each of the second and third sealing portions 24b and 24c. If the insulating tape 46 extends beyond the corner where the first sealing portion 24a overlaps each of the second and third sealing portions 24b and 24c, even when the second and third sealing portions 24b and 24c are folded along the folding lines L, respectively, the edges of the sealing portions 24a through 24c do not interfere with a protective circuit module. Accordingly, an electrical short circuit and corrosion occurring at the edges of the sealing portions 24a through 24c can be completely prevented.

The insulating tape 46 may be integrally formed, as shown in FIG. 24. However, the present invention is not restricted thereto. A plurality of insulating tapes may be respectively disposed between the first sealing portion 24a and the second sealing portion 24b and between the first sealing portion 24a and the third sealing portion 24c.

Some of the advantages of the present invention include, firstly, since the edges of sealing portions are prevented from interfering with a circuit and electronic parts on a protective circuit module, an electrical short circuit between the protective circuit module and the sealing portions and corrosion of a metal core of a pouch case can be prevented.

Secondly, when a pouch type secondary battery is packaged into an external pack, and particularly, into a curved external pack, the pouch type secondary battery is prevented from interfering with the external pack. As a result, multiple packaging designs are possible.

Thirdly, a sealing portion, through which electrode tabs extend from a pouch and on which a protective circuit module is mounted, can be made thinner. As a result, the volume of a pouch type secondary battery can be decreased and the capacity thereof can be increased.

Fourthly, since a cut portion is designed to easily break when an internal pressure of a pouch type secondary battery exceeds a predetermined limit, explosion and fire of the pouch type secondary battery can be prevented. Accordingly, safety of the pouch type secondary battery can be increased.

Although a few embodiments of the present invention have been shown and described, it will be understood by those skilled in the art that changes may be made in these elements without departing from the spirit and scope of the invention, the scope of which is defined in the appended claims and their equivalents.

What is claimed is:

1. A secondary battery comprising:
   an electrode assembly having a first electrode plate, a second electrode plate, and a separator;
   a pouch case made of a flexible material having a metal layer of which surfaces are coated by a polymer material, the pouch case comprising a container accommodating the electrode assembly, and sealing portions formed along edges of the container and consisting of opposing layers of the polymer material, the sealing portions comprising a first sealing portion through which electrode tabs of the electrode assembly extend from the pouch case, and a second sealing portion and a third sealing portion positioned at opposite sides of the first sealing portion, the second and third sealing portions being folded only once toward the container so as to be disposed along only corresponding sides of the container;
   cut portions formed by cutting a corner between the first sealing portion and the second sealing portion and a corner between the first sealing portion and the third sealing portion;
   further comprising auxiliary cut portions at corners of the respective second and third sealing portions at a side opposite to the first sealing portion; and
   a protective circuit module connected to the electrode tabs and mounted on an outer surface of the first sealing portion, the protective circuit module having at least a surface onto which a circuit is printed and at least an electronic part, wherein the cut portions do not electrically contact the surface or the electronic part of the protective circuit module,
   wherein a minimum distance between each cut portion and the container is set such that at least one of the cut portions is a safety valve, and breaks apart the opposing layers of the polymer material, to release an internal pressure through the safety valve, when an internal pressure of the container is between about 4 and 8 atmospheres.

2. The secondary battery of claim 1, wherein at least one of the cut portions is formed to be slanted.

3. The secondary battery of claim 1, wherein at least one of the cut portions is cut in a form of a curve.

4. The secondary battery of claim 3, wherein the curve is a single circular arc.

5. The secondary battery of claim 3, wherein the curve comprises at least two circular arcs having different radii.

6. The secondary battery of claim 1, wherein an end of each cut portion is positioned in at least the first sealing portion.

7. The secondary battery of claim 1, wherein an end of one of the cut portions is positioned on a border line between the first and second sealing portions, and an end of another one of the cut portions is positioned on a border line between the first and third sealing portions.

8. The secondary battery of claim 1, wherein an end of one of the cut portions is positioned in the second sealing portion, and an end of another one of the cut portions is positioned in the third sealing portion.

9. The secondary battery of claim 1, wherein the pouch case is packaged into an external pack.

\* \* \* \* \*